C. H. GERLING.
PICKER FOR POTATO PLANTERS.
APPLICATION FILED SEPT. 20, 1909.
961,436.
Patented June 14, 1910.
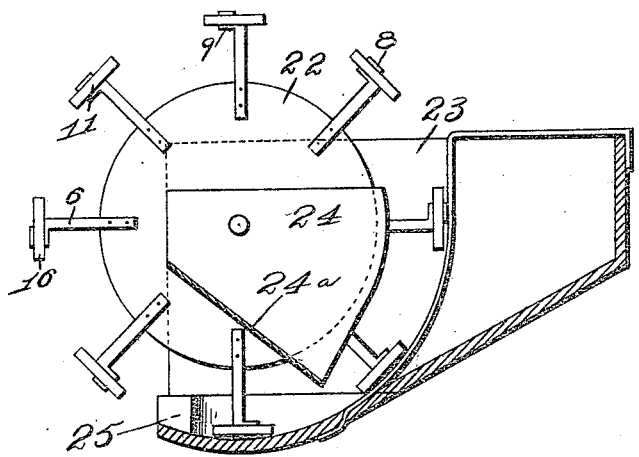
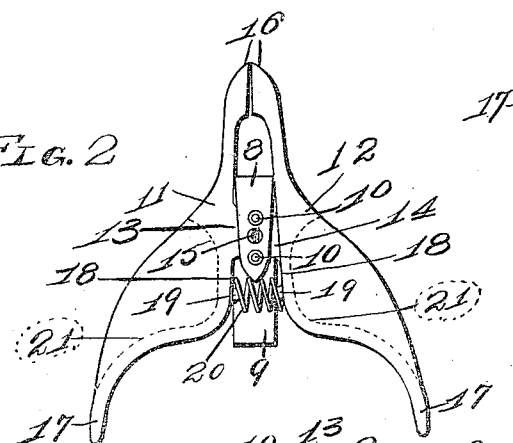
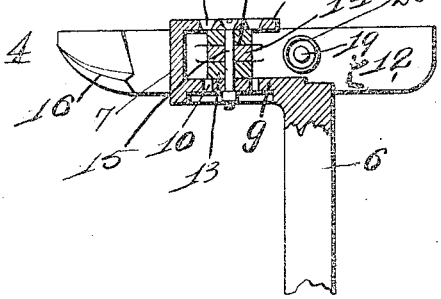
Witnesses
W. B. Stein
L. A. L. McIntyre
Inventor
Charles H. Gerling
by Hopkins & Eicks Attys.

UNITED STATES PATENT OFFICE.

CHARLES H. GERLING, OF EDWARDSVILLE, ILLINOIS, ASSIGNOR TO BERNHARDT MANUFACTURING COMPANY, OF EDWARDSVILLE, ILLINOIS, A CORPORATION OF ILLINOIS.

PICKER FOR POTATO-PLANTERS.

961,436.

Specification of Letters Patent. Patented June 14, 1910.

Application filed September 20, 1909. Serial No. 518,703.

*To all whom it may concern:*

Be it known that I, CHARLES H. GERLING, a citizen of the United States, and resident of Edwardsville, Illinois, have invented certain new and useful Improvements in Pickers for Potato-Planters, of which the following is a specification.

My invention relates to an improved picker for potato planters, and has for its object to provide a picker having a small number of parts, which parts are readily removable and interchangeable for purposes of replacement and repair.

In the drawings—Figure 1 is a side elevation of a series of pickers of my invention in place upon the circular disk whereby they are carried; the adjacent parts of the potato planter being indicated in section. Fig. 2 is a top plan view of the picker of my invention. Fig. 3 is a rear elevation of the same. Fig. 4 is a longitudinal view showing the meeting portions of the jaws of the picker in section. Fig. 5 is a front plan view of the front end of the jaws, showing them in engagement with a fragment of seed potato.

As shown in the drawings, the picker of my invention is carried by a bar 6 whose top is provided with a yoke 7 having the parallel perforated walls 8 and 9, provided with a series of registering perforations 10. Between the walls 8 and 9 the picker-arms 11 and 12 are mounted, these arms having inwardly projecting lugs 13—13 and 14 which fit into each other and are adapted to be pivotally secured to each other and to the yoke 7 by a bolt 15 passing through the perforations 10—10. At their front extremities the arms 11 and 12 are provided with toothed jaws 16—16 adapted to securely hold a fragment of seed potato; the arms 11 and 12 being provided with the handles 17—17 at their rear ends, which handles terminate inwardly with the parallel walls 18—18 which are provided with inwardly projecting lugs 19, which lugs 19 serve to hold the ends of the coil-spring 20 in place. Upon their lower faces the arms 11 and 12 are cut away as indicated by the dotted lines 21 for the purposes of economy of material and lightness.

At their inner ends the bars 6 are radially mounted upon the revolving disk 22, which is mounted within the hopper 23 in which is located an inclined shield 24 located on each side of the disk, feeding the seed potatoes along its inclined bottom 24ª to the pickers. The handles 17—17 are pressed toward each other to open the picker for the reception of the seed potatoes, by means of parallel guides 25 at the bottom of the planter, one of which guides is illustrated in Fig. 1.

Having fully described my invention, what I claim as new and desire to have secured to me by the grant of Letters Patent, is:

1. The improved picker for potato planters comprising two oppositely mounted arms pivotally connected together; a yoke wherein said arms are pivotally and adjustably mounted; a coil-spring interposed between said arms; and toothed jaws formed at the front extremity of said arms, substantially as described.

2. The improved picker for potato planters comprising arms provided with toothed jaws at their front extremities, handles at their rear ends, and intermediate perforated inwardly-projecting lugs; a yoke having parallel perforated walls wherein said lugs are received and pivotally and adjustably mounted; and a coil-spring interposed between said jaws back of their points of pivotal support, substantially as described.

In testimony whereof, I have signed my name to this specification, in presence of two subscribing witnesses.

CHARLES H. GERLING.

Witnesses:
JAMES L. HOPKINS,
JOHN STOLZE.